United States Patent Office 3,291,698
Patented Dec. 13, 1966

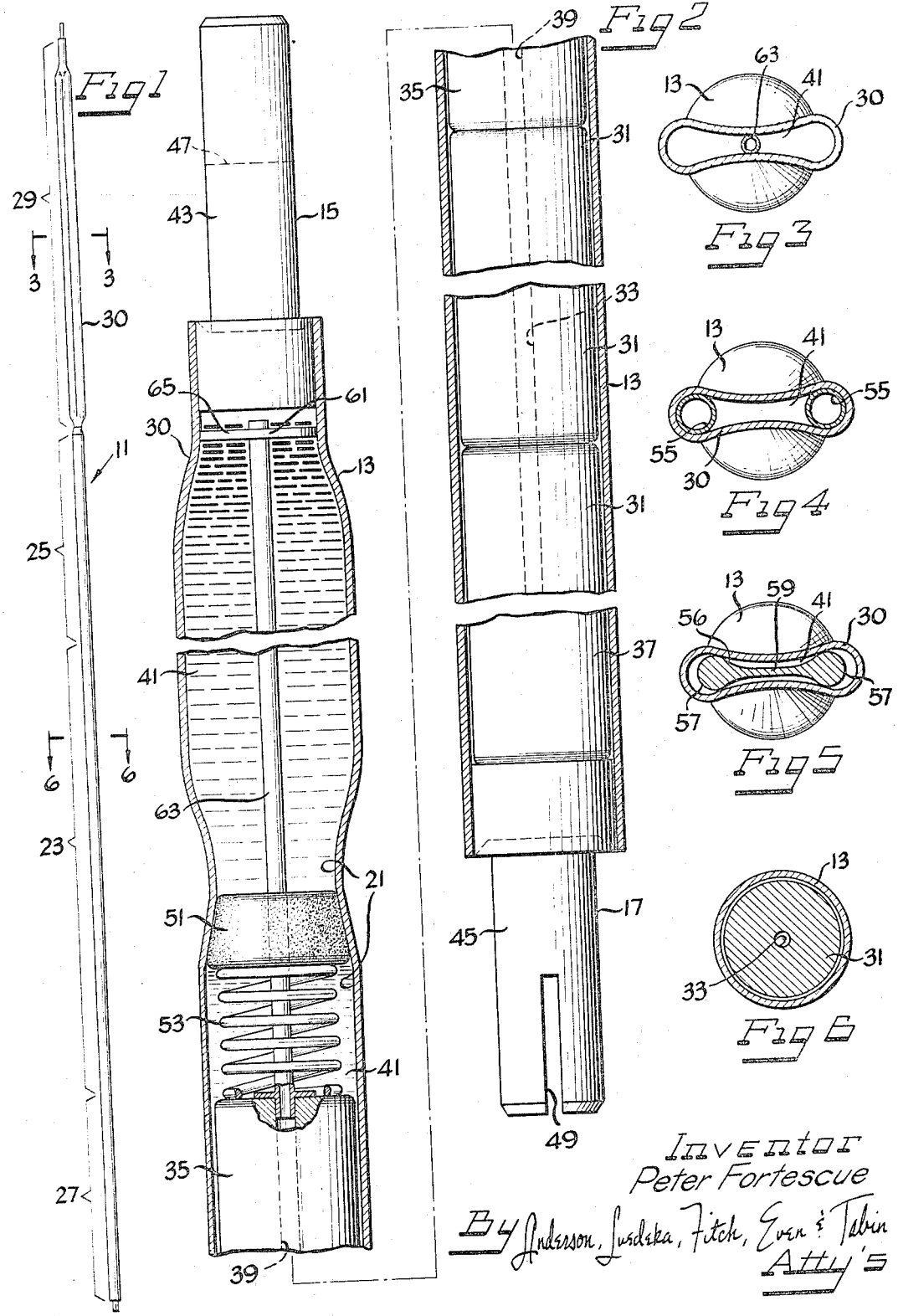

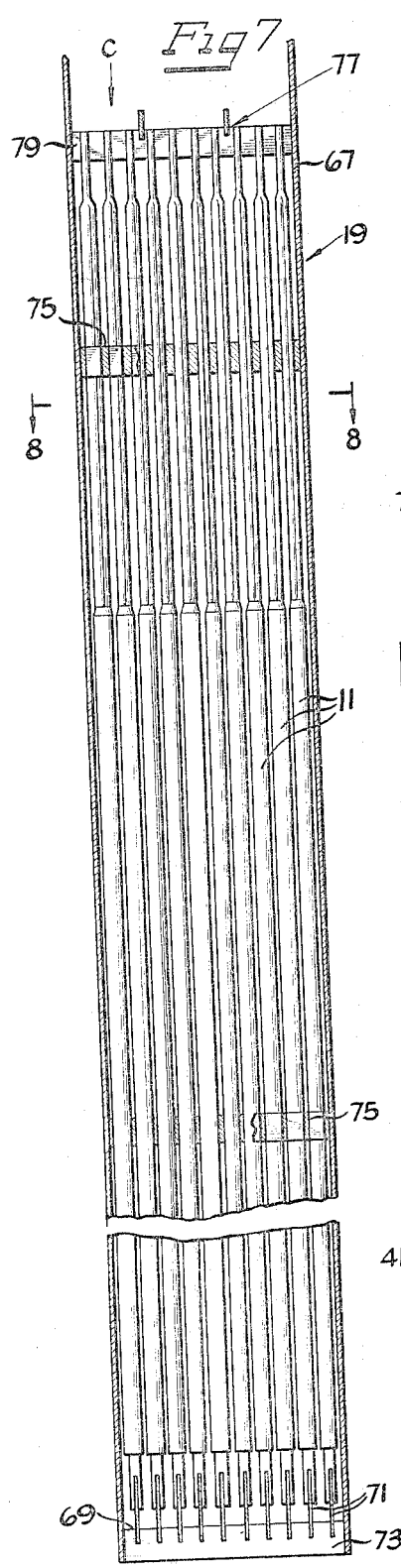
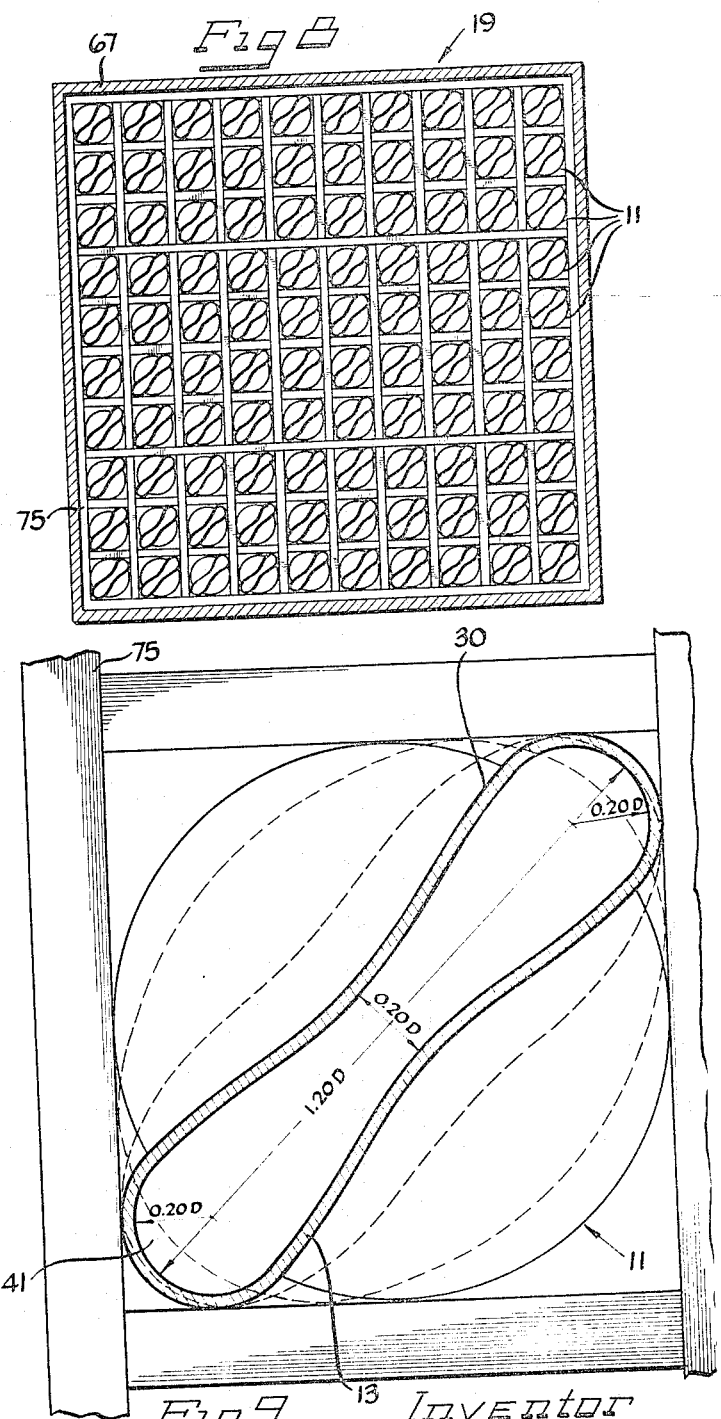

3,291,698
FUEL ELEMENT
Peter Fortescue, Rancho Santa Fe, Calif., assignor, by mesne assignments, to the United States of America as represented by the United States Atomic Energy Commission
Filed Apr. 19, 1965, Ser. No. 449,032
14 Claims. (Cl. 176—68)

This application relates to fuel elements for nuclear reactors, and more particularly to fuel elements which employ an outer protective cladding which surrounds the nuclear fuel material.

Although in many instances, the use of an outer cladding is desirable, and even sometimes necessary, to separate the nuclear fuel material from the reactor coolant stream, there are various difficulties associated with such a fuel element construction. One difficulty resides in the maintenance of a path of good thermal conduction from the nuclear fuel material to the surrounding cladding in spite of the changing temperature and pressure conditions which occur in a nuclear reactor. Differential thermal expansion is an inherent cause of trouble if direct mechanical contact is used to bond the nuclear fuel to the cladding. This difficulty may be particularly severe in the case of fuel elements for highly rated fast nuclear reactors.

To avoid difficulties associated with direct mechanical contact, the use of a liquid metal to provide an intermediate path between the nuclear fuel and the cladding has been proposed. There are problems when this type of fuel element is employed in a nuclear reactor which operates at a relatively high coolant pressure. In such an instance, it may be necessary to employ cladding or can thick enough to withstand the high external pressure without direct mechanical support from the solid fuel material therewithin. It has been impractical to completely fill the interspaces of such a sealed can with liquid metal to provide support for the can wall because of differential expansion and also because of the stress caused by the increase in pressure that results from an accumulation of fission product gases from the fissioning nuclear fuel. To increase the thickness of the cladding to a point wherein it is sufficiently rigid to resist deformation while under high pressure is considered impractical because of the resultant penalty to nuclear performance of the reactor from absorbtion of neutrons and obstruction of coolant passages. Other solutions to this problem are desired.

It is an object of the present invention to provide an improved fuel element for a nuclear reactor. It is another object to provide an improved fuel element which employs solid nuclear fuel material within a protective outer cladding. It is a further object to provide an improved nuclear fuel element which utilizes a fluid substance to provide a good heat transfer path between solid nuclear fuel material and a surrounding relatively thin cladding and which is suitable for use in a nuclear reactor employing a high pressure coolant stream. A still further object is to provide an improved fuel element which incorporates space therewithin wherein fission product gases can be accumulated without increasing the internal pressure above desirable limits. Still another object is to provide an improved fuel element which utilizes solid nuclear fuel material and a liquid substance within a protective can wherein undesirable reaction products from interaction between the liquid substance and the nuclear fuel material are automatically removed from fueled areas of the fuel element. These and other objects of the invention are more particularly set forth in the following detailed description and in the accompanying drawings wherein:

FIGURE 1 is an elevational view of a fuel element embodying various of the features of the invention;

FIGURE 2 is an enlarged view of the fuel element of FIGURE 1, shown with portions broken away and some parts in sections;

FIGURE 3 is an enlarged sectional view of the fuel element taken generally along line 3—3 of FIGURE 1;

FIGURE 4 is an enlarged sectional view, similar to FIGURE 3, of an alternate embodiment of a fuel element having various of the features of the invention;

FIGURE 5 is an enlarged sectional view, similar to FIGURE 3, of another alternate embodiment of the fuel element having various features of the invention;

FIGURE 6 is an enlarged sectional view of the fuel element taken generally along line 6—6 of FIGURE 1;

FIGURE 7 is an enlarged vertical sectional view of a fuel element cluster incorporating a plurality of the fuel elements shown in FIGURE 1;

FIGURE 8 is an enlarged cross-sectional view taken generally along line 8—8 of FIGURE 7; and FIGURE 9 is an enlarged fragmentary view of FIGURE 8.

It has been found that an improved nuclear reactor fuel element, which employs solid nuclear fuel and a material that is fluid at the operating temperatures of the nuclear reactor within a sealed outer cladding, can be constructed to include expansion means so designed that it expands or contracts in response to internal and external pressure differences to change the total associated volume and thereby equalize the pressure interior and exterior of the fuel element. For example, when the fuel element is initially disposed within a high pressure coolant stream, contraction occurs until the pressure upon the fluid material therewithin is approximately equal to the coolant stream pressure.

Additionally, the fuel element readily accommodates the accumulation of fission product gases which result from the fissioning of the nuclear fuel. After operation of the fuel element in a nucelar reactor for a significant period, there is a substantial accumulation of fission product gas which would significantly increase the internal pressure within a nonexpansible sealed container. In the improved fuel element, the expansion means merely expands to a degree sufficient to increase the total associated volume and proportionately lower the interior pressure within the fuel element. The interior pressure of the improved fuel element thus always remains at approximately the pressure exterior of the fuel element.

Referring now to the drawings, a fuel element 11 is illustrated in FIGURE 1 which, throughout most of its length, has the shape of a cylinder of circular cross section and constant diameter. The fuel element 11 includes an outer cladding or can 13 which is tubular in shape and the ends of which are closed by a top end closure 15 and a bottom end closure 17, which end closures aid in supporting the fuel element 11 within a fuel element cluster 19 (FIG. 7). The seals at the top closure 15 and at the bottom closure 17 provide a fluid-tight interior chamber 21 within the hollow, tubular cladding 13.

The interior chamber 21 runs longitudinally throughout the elongated fuel element and is divided into four functional regions. A central region 23 of the fuel element 11 serves as the fueled region wherein the nuclear fuel material is disposed. Above and below the fueled region 23 are an upper blanket region 25 and a lower blanket region 27 wherein fertile and/or neutron-reflective material is disposed. Between the upper blanket region 25 and the top closure 15, there is provided the fourth region 29, termed a void region, wherein gaseous fission products are accumulated. It is in the section of the cladding 13 which borders this region 29 wherein expansion means 30 is formed, as will hereinafter be described in detail.

In the fueled region 23 of the illustrated fuel element 11, nuclear fuel material in the form of short compacts 31, generally cylindrical in shape, are disposed. Preferably, the fuel compacts 31 have an axial central hole 33 therewithin which provides some space to accommodate swelling of the fuel which occurs after prolonged periods of irradiation. The hole 33 also performs another function which is described in detail hereinafter.

The illustrated fuel element 11 is designed for use in a fast gas-cooled reactor, such as that described in detail in copending application Serial No. 374,908, filed June 15, 1964, in the name of Peter Fortescue and Raymond T. Shanstrom. The nuclear fuel comprises a mixture of uranium and plutonium (U-238, Pu-239 and Pu-240), preferably in the carbide form. The plutonium acts as the primary fissile feed, and the uranium acts as the fertile material. Because of its high fast-neutron fission cross section, the U-238 also contributes a substantial number of fission neutrons. The compacts of mixed carbides may be fabricated in any suitable manner, as for example by sintering or hot pressing. Depending of course upon the particular reactor in which the fuel element is intended to be used, U-235 or U-233 might be used as the fissile material instead of plutonium. In addition to fuel carbides, other suitable forms of the fuel may be used, such as oxides, phosphides, silicides, etc.

The upper blanket 25 and the lower blanket 27, which serve as parts of the reactor reflector, or breeding blanket, contain pellets 35 and 37, respectively, also in the shape of short cylinders. Any suitable material which has nuclear properties appropriate to the desired function of a breeding blanket or reflector and which is stable at the temperatures contemplated during reactor operation may be employed. Examples of suitable materials from which the pellets for the upper and lower blankets can be made include, for example, suitable compounds of uranium-238 or thorium and/or beryllium for reflection and local spectrum moderating, if desired. The pellets 35, employed in the upper blanket 25, are preferably provided with axially extending holes 39 which are aligned with the holes 33 in the fuel compacts 31 and so provide a central passageway which extends continuously from the bottom of the fueled region 23 to the top of the upper blanket 25.

The remainder of the chamber 21, which is not occupied by solid components, is filled with a substance 41 which is fluid at the anticipated operating temperature of the reactor. A liquid substance 41 is preferably employed which has a relatively high thermal conductivity and therefore provides a good intermediate heat transfer path between the nuclear fuel compacts 31 and the cladding 13. Any suitable gas, liquid or solid may be employed which is fluid at the operating temperature of the reactor, and which is chemically compatible with the other components.

The use of a gaseous substance 41 may be desirable to solve compatibility problems with certain fuels or to facilitate the use of a fueled region 23 filled with a compacted bed of granular fuel. Preferably, a fusible salt or a metal which is liquid at about room temperature, as for example sodium or potassium, is employed.

As best seen in FIGURE 2, the top and bottom end closures 15 and 17 are respectively formed with top and bottom pins 43 and 45 at the ends thereof. The pins 43, 45 have slots 47, 49, respectively which facilitate the mounting of the fuel elements 11 in its proper operating position, as will be hereinafter described.

To prevent upward shifting of the upper pellets 35, which might otherwise allow axial fuel movement within the cord, a frusto-conical porous plug 51, located by a neck in the cladding 13, is positioned between the void region 29 and the upper blanket 25. A coil spring 53 compressed between the plug and the uppermost pellet 35 serves to keep all pellets below it in their lowermost position. The porous plug 51 is made of a suitable material, such as stainless steel or a material similar to the cladding, which withstands deterioration from irradiation and the high operating temperatures. The plug 51 may have a plurality of holes extending therethrough to permit free fluid flow or may just have such a high porosity that fluids pass easily therethough.

As best seen in FIGURES 2 and 3, a portion of the wall of the cladding 13 adjacent the void region 29 is deformed to form the expansion means 30. Deformation in this manner reduces the volume of the void region 29 defined by the cladding wall without decreasing the surface area of this portion of the wall, and accordingly permits expansion and contraction without stretching the cladding material. As a result of this deformation, this portion of the cladding wall becomes weaker than the rest of the cladding 13 so that the cross section of this portion changes in response to changes in the operating conditions to which the fuel element 11 is subjected. This portion of the cladding 13 should be sufficiently flexible to permit repeated expansive and contractive changes in cross sectional shape without rupture or cracking. Accordingly, the entire cladding may be made of a material which has the requisite ductility and also has the other characteristics necessary for a fuel element cladding, such a good resistance to radiation, good resistance to corrosion by the coolant stream, compatibility with the coolant and with the fluid substance 41, etc. Alternately, only the flexible portion may be made of a sufficiently ductile material and the remainder of the cladding 13 made of a more rigid material. In such a case, the two different materials may be connected to each other by known metallurgical methods.

To avoid the incorporation of another joint in the fuel element 11, which would increase the possibility of trouble in the high temperature, high pressure environment of an operating nuclear reactor, it is preferred to form the cladding from a single piece of material. Examples of materials which meet the desired ductility requirements, and which are also generally suitable otherwise as a cladding for a nuclear reactor fuel element include stainless steels, such as type 304, and Hastelloy X, a high chromium alloy of nickel. Because the temperature and local neutron flux in the void region are lower than in the fueled region, the cladding material adjacent the void region is less susceptible to embrittlement. Thus, location of the expansion means 30 adjacent the void region 29 locates the cladding area of highest ductility requirement at the position of lowest neutron embrittlement and enables a single piece of material to be used to clad both these fuel element regions.

An example of the preferred shape of deformation to form the expansion means is best seen in FIGURE 3. The tubular cladding at the void region of the fuel element is deformed gradually inward along two diametrically opposite, longitudinal lines to form a generally hour-glass or dumbbell shape wherein the maximum cross sectional dimension is greater than the diameter of the undeformed circle and the minimum transverse dimension is less than the diameter of the two semi-circular ends. Other suitable shapes may also be employed which shapes preferably decrease the internal volume without substantially changing the outer surface area, for example flat-sided oval, an ellipse, or a four-lobe clover leaf. The shape should be one which minimizes the strain caused in forming the cladding material to the desired cross sectional change and accordingly any sharp curvatures in the shape should be avoided. In addition, it is preferred that the shape should be such as to retain 4-point contact with the square which circumscribes the circular cross section of the tube which is deformed, for reasons which are fully explained hereinafter.

Deformation may be accomplished using any suitable forming procedure, such as rolling whereby a progressive reduction to the internal cross section shape desired is easily produced throughout the length desired, without any substantial change in the surface area of the portion of the cladding 13 being deformed. To avoid the formation of localized "wrinkles" in the deformed areas, it is desirable to accomplish deformation while applying a substantial internal hydraulic pressure to the cladding 13. Because there is no significant change in the outer surface area of the cladding portion, the ductility remains uniform throughout.

After the necessary forming operations on the cladding 13 are completed, the porous plug 51, spring 53, upper blanket pellets 35, fuel compacts 31 and lower blanket pellets 37 are inserted, and the bottom end closure 17 is suitably installed. The remaining space in the interior chamber 21 is substantially filled with the fluid substance 41. Filling is easily accomplished when a liquid substance is used by heating the fuel element 11 and the substance 41 to a temperature at which the substance is liquid and pouring it into the top of the chamber 21 as a liquid. After the chamber 21 is filled, the top closure is appropriately installed to seal the tubular cladding 13. To facilitate bonding of the top closure 15 to the cladding 13, the chamber 21 need not be completely filled but some tolerance is allowable. Any empty space will be filled with the inert gas (e.g. helium) under which the bonding operation is carried out. This gas functions the same as accumulated fission gas as is hereinafter described.

The deformation of the cladding 13 in the area wherein the flattening to the dumbbell shape occurs necessarily weakens the cladding at this point. Therefore, when the fuel element 11 is subjected to the high pressure of the coolant stream, it is the flattened portion, rather than some other portion of the cladding 13, where deformation takes place. However, because the interior 21 of the fuel element 11 is substantially filled with the liquid substance 41, the flattened portion of the cladding is supported by the liquid substance 41, which is, for practical purposes, incompressible. Moreover, the external pressure of the coolant stream is communicated to the liquid substance 41 within the fuel element 11 by deformation of the flattened section, and this pressure is transmitted throughout the entire interior 21 of the fuel element cladding virtually eliminating any pressure differential between the interior and the exterior of the fuel element cladding wall adjacent the fueled region 23. This action occurs even though part of the chamber 21 is occupied by gas because inward deformation merely takes place until the gas has been compressed to the pressure of the liquid. This pressure equalization is important because the cladding adjacent the fuel region 23 is subjected to high intensity neutron irradiation and is thus the likely portion to suffer neutron embrittlement. Accordingly, reduction of stress from a pressure differential in this area reduces the possibility of failure of the cladding 13.

In general, the amount of deformation of the flattened section produced by the external pressure of the coolant stream is controlled by the completeness of the filling with the liquid substance 41. The presence of the liquid precludes complete flattening of the entire length of this section. However, because deformation can create an area of localized weakness, it may be desirable to positively preclude complete collapse of any local length of the tubular cladding 13. Internal support means may be disposed within the void region 29 of the fuel element to preclude such complete collapse. However, such an internal support means should not be so large as to greatly decrease the volume of the void region 29 which, as will be hereinafter described, serves as a reservoir for the liquid substance 41 and as a collector for fission product gases. Employment of internal support means may be especially important when a fluid substance 41 which is gaseous is used.

Two examples of internal support means suitable for use when deformation is in the shape of a dumbbell are depicted in FIGURES 4 and 5. In FIGURE 4, two tubes 55 are used which have outer diameters that fairly closely approximate the cross sectional inner diameters of the rounded ends of the dumbbell. The tubes 55 may be freely disposed in the void region 29 or may be appropriately supported a desired distance above the porous plug 51. The outer diameter of each tube 55 may be less than one-half of the inner diameter of the undeformed tubular cladding 13 so that the two tubes 55 do not preclude expansion of the flexible portion of the cladding outward to its original circular cross sectional configuration. The provision of the two tubes 55 of these proportions so supports the deformed cladding portion to also prevent collapse along a line longitudinal of the fuel element, which collapse could conceivably result in failure of the cladding 13.

In the alternate embodiment as shown in FIGURE 5, an internal support structure 56 is illustrated having the general shape of two rods 57 joined together by a continuous web 59. The web 59 serves to space the two rods 57 the desired distance apart. Moreover, the web 59 physically prevents the formation of excessively sharp curvature of the cladding due to local displacement of the liquid 41 in the region between the two rods 57. The width of the support structure 56 is approximately equal to the internal diameter of the undeformed cladding adjacent the void region 29, or a little greater than this diameter, thereby allowing expansion of this cladding portion to nearly its full circular cross sectional area. Provision of a support structure 56 of a slightly greater diameter assures lateral contact within the fuel element cluster 19 as is hereinafter described in detail. If desired, the structure 56 may rest atop the porous plug 51.

Establishment of the expansion means 30 as a deformed portion of the cladding 13 adjacent the void region 29 and therefore well above the reactor core has several advantages. The physical requirements for the cladding material are generally less severe overall because, compared to cladding adjacent the fuel region 23, this portion of the cladding is subjected to lower temperature and considerably lower neutron flux.

Moreover, provision of the expansion means 30 adjacent the void region 29, relieves the portion of the cladding surrounding the fueled region 23 from subjection to expansion and contraction as a result of differential thermal expansion between it and the fuel compacts 31. The void region 29 cladding portion is subject to rapid and substantial deformation only when external coolant pressure is inadvertently lost, whereas the cladding adjacent the fueled region 23 is subject to change on frequent occasions when the reactor power, and consequently fuel temperature is significantly changed. Provision of the flattened portion adjacent the void region 29 confines substantially all the deformation of the fuel element (because deformation occurs at the weakest point) to this region which is at a relative low temperature and a relatively low neutron flux and where there is no need to compensate for internal solid materials, such as fuel compacts, which might interfere with the desired expansion and contraction.

During operation of the fuel element 11 in a nuclear reactor, fission product gases are produced in the fissionable fuel which migrate from the fuel and thereby increase the internal pressure within the cladding 13. The amount of fission product gases produced increases with continued use of the fuel element so that after extended use of a sealed fuel element there might be a considerable accumulation of fission products which would result in a substantial increase in the internal pressure within the fuel element. Such an increased pressure presents a potential cause of rupture and failure of the fuel element.

In the fuel element 11, fission product gases find their way upward through the porous plug 51 and into the void region 29 wherein they accumulate. However, there is negligible build-up of contained gas pressure due to the growing accumulation of fission products. Rather the potential pressure build-up is accommodated by expansion of the expansion means 30. Accordingly, the spacial difference in volume between the undeformed void region 29 of the fuel element and the deformed void region serves as a collector wherein the fission product gases are accumulated. However, because of the particular design, inclusion of this collector does not preclude continual complete filling of the interior chamber 21 by fluid which accordingly transmits the pressure external of the fuel element to all points along the internal cladding wall.

In a fuel element 11, several additional advantages are gained from the use of fuel compacts 31 having an axial hole 33 therein, together with aligned axial holes 39 within the upper blanket pellets 35. The use of fuel compacts 31 of this shape reduces the distance the heat generated within the fuel must travel to reach the liquid substance 41 and accordingly reduces the internal fuel temperature. In addition, the fuel compacts and the reflector pellets are made with diameters less than the internal diameter of the cladding 13. At operating conditions, the liquid substance 41 occupies both the center passageway, which is created by the aligned holes in the fuel compacts 31 and in the reflector pellets 35, and in the annular gap between the inner wall of the cladding 13 and the lateral surfaces of the smaller fuel compacts and reflector pellets. Because of the proximity of the annular gap to the coolant stream which flows outside the cladding wall, the liquid substance 41 in the annular gap is at a lower temperature than the liquid in the center passageway. Accordingly, a strong natural convection current is set up in the vertical fuel element 11. Current flow is upward through the center passageway into the reservoir in the void region 29 and downward in the annular gap.

By employing the fuel element 11 in a reactor where the coolant is circulated downward past the fuel elements, the void region 29 is maintained at a lower temperature than the remainder of the fuel element. In this environment, the liquid reservoir at the top serves as a cold trap wherein oxides and other contaminants, including partially soluble fission products, carried by the liquid substance 41 are preferentially deposited on surfaces in the void region 29. As a result of this natural convection-cold trap arrangement, it may be feasible to utilize sodium as the liquid substance 41 together with uncoated oxide nuclear fuel because over accumulation (and resultant local deterioration in the heat transmission) of sodium oxide in the fueled region 23 is thereby avoided.

It is also possible to further enhance the effect of this convection current by optionally including a filtering arrangement 61 within the void region 29. A conduit 63 may be extended from the top of the center hole 39 of the uppermost reflector pellet 35, through the porous plug 51, and upward through a porous filter 65 near the top of the chamber 21. The filter 65 is made of a suitable material, such as sintered stainless steel. Accordingly, the liquid substance 41 moving upward in the center passageway must pass through the filter 65 before re-entering the main portion of the liquid reservoir. Alternately, the conduit 63 might be merely extended through the porous plug 51, and the plug 51 be made of a material which serves as a suitable filter. If desired, additional insoluble chemical agents might be incorporated in association with the filter 65 to further clean up of likely contaminants.

To enhance this natural convection current, a sizeable gap might be provided between the lowermost fuel compact 31 and the uppermost pellet 37 of the lower reflector. One simple way of providing such a gap would be to cut radial grooves in the upper surface of the uppermost reflector pellet 37. Moreover, in the fuel element 11 wherein the fuel is in the form of separate compacts 31 stacked one atop another, the convection current may be further enhanced by minimizing radial leakage between adjacent pellets and compacts. This might be done in any suitable way, as for example providing interlocking annular tongues and grooves in mating surfaces.

Although the expansion means 30 is illustrated in the form of the flattened, dumbbell-shape portions of the cladding 13 adjacent the void region 29, which is the preferred form thereof, other suitable constructions may be employed. For example, the cladding 13 may be formed with a plurality of circumferential convolutions therein which may be expanded outward or inward by changes in the external and internal pressure. In an arrangement of this type, provision is made for axial movement of the fuel element, as by lengthening the top pins 43 and the slots 47 therein to provide the requisite distance. Alternately, a separate bellows-type expansion chamber might be employed adjacent the fuel element with a conduit extending therebetween for fluid communication. Such a bellows-type arrangement might prove especially feasible when the fuel elements are used in a cluster for then a single bellows might be employed for connection to a plurality of fuel elements.

The illustrated fuel element 11 is designed for use in a fast gas-cooled reactor, such as that disclosed in aforementioned application Serial No. 374,908. In the reactor disclosed in this application, the fuel element 11 is used in the fuel element cluster 19 which is shown in FIGURE 6. The cluster 19 comprises a tubular outer shell or box 67 having a square cross section. An array of one hundred fuel elements 11 are supported within this box in rows of ten each. The fuel elements 11 are supported at their bottoms by a lower support frame 69 which comprises ten parallel support strips 71 extending between and mounted in opposite walls of the square box 67. The slots 49 in the bottom pins 45 of the fuel elements fits over the support strips 71. A pair of cross strips 73 run perpendicular to the ten support strips 71 to reinforce them.

Honeycomb spacer frames 75 are provided intermediate the ends of the box 67 to maintain the desired spacing through the cluster 19. A top frame 77, which is similar to the lower support frame 69, is provided to anchor the top ends of the fuel elements 11. The top frame 77 has ten spacer strips 79 which extend at right angles to the ten lower support strips 71. The slots 47 in the top pins 43 of the fuel elements receive the strips 79 and have a depth slightly greater than the width of the spacer strips 79 to permit some axial expansion of the fuel elements 11.

Suitable support means (not shown) is provided at the upper end of the box 67 for hanging the fuel element cluster 19 from a top grid plate in a nuclear reactor. One support means is described in detail in the aforesaid pending patent application Serial No. 374,908. Obviously, other suitable support means may also be used.

As best seen in FIGURES 7 and 8, the fuel elements 11 are arranged within the fuel element cluster 19 with a particular orientation so as to accommodate the dumbbell-shaped portions of the cladding 13. In this respect, the illustrated cluster 19 positions all of the fuel elements with the flattened portions at the same 45° angle, i.e. along a diagonal of the square cross section of the square passageways which extend through the honeycomb spacer frame 75. Obviously, if desired, certain of the fuel elements could be disposed at 90° to the illustrated orientation to provide a different coolant flow pattern through the cluster 19.

As best seen in FIGURE 9, the dumbbell-shape is proportioned so that there remains 3-point, and preferably 4-point, contact between the external lateral surface of the cladding 13 along the deformed section and the inner walls which define the particular enclosing square in the intermediate spacer frame 75 at this location. It is considered important from the standpoint of eliminating possible vibration of a fuel element 11 within the cluster 19 to have such point contact between spacer frame 75 and fuel element throughout the life of the fuel element cluster. Accordingly, the deformation is preferably such that, regardless of the stage of expansion of the flattened portion of the cladding, there remains 4-point contact.

In the illustrated arrangement, the controlling size is the circumference of the unexpanded circle, which has 4-point contact with the square in which it is inscribed, i.e. the particular square passageway through the spacer frame 75. This 4-point contact between cladding 13 and frame 75 remains throughout the expansion as the dumbbell cross sectional shape approaches circular shape. This is illustrated in dotted lines in FIGURE 9. Accordingly, the illustrated dumbbell shape is considered particularly appropriate to provide adequate expansion means 30. Other similar shapes, such as a generally flat oval, might also be employed.

The following is a detailed description of one suitable form of a nuclear reactor fuel element 11 embodying various of the features of the invention. The particular fuel element described is designed for use in a high temperature, fast, gas-cooled reactor wherein helium at a pressure of about 1,000 p.s.i. is the intended coolant, one example of such a reactor being described in detail in the aforesaid copending application Serial No. 347,908. It should be understood that the following example in no way limits the scope of the invention which is defined solely by the claims at the end of this specification.

EXAMPLE

Solid cylindrical fuel compacts 31, 1 cm. in diameter and 2 cm. long, having a central hole 33 of 2 mm., are employed. These fuel compacts are made of a mixture of plutonium monocarbide and uranium (U–238) monocarbide in the ratio of about 1 to 6, PuC:UC. The fueled region 23 of the fuel element 11 is about 100 cm. in length, comprising 50 fuel compacts 31 stacked one atop another.

The fuel element cladding 13 is made from a tube of Hastelloy X having an internal diameter of about 1.02 centimeters and a wall thickness of about 0.3 mm., thus providing about 2 percent diametrical allowance for the peripheral annular gap. The overall length of the cladding tube is about 260 cm., housing in addition to the 100 cm. fueled region 23, upper and lower blankets about 46 cm. in length apiece, and providing a void region 29 of about 70 cm. The pellets 35 and 37 serve as both reflectors and breeders and are made of uranium carbide (U-238). They have the same dimensions as the fuel compacts 31, except that the lower pellets 37 have no axial hole. A suitable plug 51 made of stainless steel and having a plurality of 1 mm. holes therethrough is seated in a local neck formed in the cladding 13 by a spring 53 supported on the top surface of the uppermost pellet 35.

A section of the cladding 13 which surrounds the void region 29 is deformed into a dumbbell-shape cross section. The deformation is accomplished by rolling the cladding tube (while applying an internal hydraulic pressure of about 1000 p.s.i.) to provide a smooth transition from the undeformed circular cross sectional shape to the dumbbell shape. The deformed portion from uppermost to lowermost point measures about 60 cm. with about the center 50 cm. having the dumbbell shape of constant dimensions, the remaining portion being the transition sections.

The cross sectional dimensions of the dumbbell are as follows: major dimension of 1.20 times the internal diameter "D" of the undeflected tube ($1.20 \times 1.02 = 1.224$ cm.), a radius of approximately 0.20 "D" ($0.20 \times 1.02 = 0.20$ cm.) for each of the rounded ends of the dumbbell, and a minor dimension of 0.20 "D" ($0.20 \times 1.02 = 0.20$ cm.) These dimensions are indicated on FIGURE 9. The deformed cross sectional area equals about half of the undeformed area. The wall thickness of the cladding 13 remains substantially unchanged in the deformed area.

The interior chamber 21 is filled with liquid sodium and the top and bottom end closures 15, 17 are appropriately sealed to the ends of the cladding 13 so that there is no space deliberately left within the fuel element 11 not occupied by a solid component or liquid sodium. As previously pointed out, there is a tolerance in this requirement to facilitate bonding of the top closure.

The fuel element 11 is supported within a fuel element cluster 19 together with 99 other similar fuel elements, in the manner shown in FIGURES 7–9. The pitch of the fuel elements 11 in this square array is about 1.4 cm. The plates of the spacer frame 75 have a thickness about 3.2 mm. The complete reactor utilizes 160 such fuel element clusters and produces 1800 mw.(t.) when operated at a coolant outlet temperature of about 600° C. This corresponds to a maximum fuel element surface temperature of about 690° C. and a maximum heat release per unit length of fuel element of about 40 kw./foot coolant flow being from the top of the fuel element to the bottom thereof..

These fuel elements are considered to have an average life of about 3 years. At the end of this time, fission product gas evolution has expanded the deformed portion of the cladding so that it returns to a nearly circular cross section throughout. However, because of the void space provided as a result of the inclusion of the expansion means 30, the internal pressure within the fuel element 11 is less than 1000 p.s.i, the pressure of the coolant stream. The cladding material remains free from any failure due to cyclic fatigue from flexing. The fuel element is considered completely satisfactory for use in a nuclear reactor.

Various modifications and changes in the illustrated fuel element may be made without departing from the spirit and scope of the present invention.

Various features of the present invention are set forth in the following claims.

What is claimed is:

1. A nuclear reactor fuel element which comprises fissionable nuclear fuel, an outer sealed can surrounding said fissionable nuclear fuel, and a material which is fluid at the operating temperature of the fuel element substantially filling said can, said surrounding sealed can including expansion means for equalizing the pressure internally and externally of the fuel element by expansion or contraction thereof in response to the difference in pressure exterior and interior of said sealed can.

2. A nuclear reactor fuel element which comprises fissionable nuclear fuel, an outer sealed can surrounding said fissionable nuclear fuel, and a material which is fluid at the operating temperature of the fuel element substantially filling said can, said surrounding sealed can including a flexible portion which flexes in response to the difference in pressure exterior and interior of said sealed can to equalize the pressure internally and externally of the fuel element.

3. A nuclear reactor fuel element which comprises fissionable nuclear fuel, an outer sealed can surrounding said fissionable nuclear fuel, and a material which is liquid at the operating temperature of the fuel element and which has good thermal conductivity being disposed within said can in heat-conducting contact with said fuel, said surrounding sealed can including a flexible portion made of a ductile material which portion is formed so that it flexes in response to the difference in pressure exterior and interior of said sealed can to decrease the total volume within said can when said exterior pressure exceeds said interior pressure and to increase the total volume when said interior pressure exceeds said exterior pressure without causing any accompanying significant change in the surface area thereof.

4. A nuclear reactor fuel element which comprises fissionable nuclear fuel, an elongated outer sealed can surrounding said fissionable nuclear fuel, and a material which is liquid at the operating temperature of the fuel element and which has good thermal conductivity substantially filling the unoccupied space within said can, said surrounding sealed can including a flexible portion made of a ductile material which portion is formed so that it flexes in response to the difference in pressure exterior and interior of said sealed can to decrease the total volume within said can when said exterior pressure exceeds said interior pressure and to increase the total volume when said interior pressure exceeds said exterior pressure without causing any accompanying significant change in the axial length of the fuel element.

5. A nuclear reactor fuel element which comprises fissionable nuclear fuel, an elongated outer sealed tubular can of circular cross section surrounding said fissionable nuclear fuel, and a material which is liquid at the operating temperature of the fuel element and which has good thermal conductivity substantially filling the unoccupied space within said can, said sealed can including a portion made of a ductile material which portion is formed into dumbbell cross sectional shape and flexes in response to the difference in pressure exterior and interior of said sealed can to equalize the pressure internally and externally of the fuel element.

6. A nuclear reactor fuel element which comprises fissionable nuclear fuel, an elongated outer sealed can surrounding said fissionable nuclear fuel, and a material which is liquid at the operating temperature of the fuel element and which has good thermal conductivity being disposed within said can in heat-conducting contact with said fuel, said surrounding sealed can including a hollow right circular cylindrical section of internal diameter D made of a ductile material, which section is deformed into an internal dumbbell cross-sectional shape having a major dimension of about 1.20 D, a minor dimension of about 0.20 D and a radius of curvature of about 0.20 D for each of the rounded ends of the dumbbell, whereby said deformed section flexes in response to the difference in pressure exterior and interior of said sealed can to change the total volume thereof.

7. A fuel element designed for vertical disposition in a nuclear reactor which fuel element comprises a sealed elongated can, fissionable nuclear fuel disposed within said can at a location below the top thereof, a material which is fluid at the operating temperature of the fuel element substantially filling said can, said sealed can at a location substantially above said nuclear fuel including a flexible portion made of a ductile material which portion is formed so that it flexes in response to the difference in pressure exterior and interior of said sealed can to change the total volume within said can and equalize the pressure internally and externally of the fuel element, and support means disposed within said flexible portion to prevent localized complete collapse thereof.

8. A fuel element designed for vertical disposition in a nuclear reactor, which fuel element comprises a cylindrical fissionable nuclear fuel compact having an axially extending hole formed therein, an elongated outer sealed tubular can surrounding said fuel compact, the internal cross sectional dimensions of said tubular can being larger than those of said cylindrical fuel compact to provide a peripheral gap therebetween, and a material which is liquid at the operating temperature of the fuel element and which has good thermal conductivity substantially filling said can including said axially extending hole and said peripheral gap, said surrounding sealed can including a flexible portion at a location vertically above said fuel compact which portion is formed so that it flexes in response to the difference in pressure exterior and interior of said sealed can to change the total volume within said can and equalize the pressure internally and externally of the fuel element, whereby in operation of said fuel element a convection flow of liquid is established upward in said axial hole to a cooler portion of said can where deposition of contaminants may take place and then downward from the cooler portion along said peripheral gap.

9. A fuel element designed for vertical disposition in a nuclear reactor, which fuel element comprises a cylindrical fissionable nuclear fuel compact having an axially extending hole formed therein, an elongated outer sealed tubular can surrounding said fuel compact, the internal cross sectional dimensions of said tubular can being larger than those of said cylindrical fuel compact to provide a peripheral gap therebetween, said fuel compact axial hole being in fluid communication with said peripheral gap at a location below said fuel compact, a material which is liquid at the operating temperature of the fuel element and which has good thermal conductivity substantially filling said can including said axially extending hole and said peripheral gap, a porous filter element located in said tubular can vertically above said fuel compact and conduit means connecting with said axial hole in said fuel compacts and extending through said filter to a point thereabove, said surrounding sealed can at a location above said fuel compact having a flexible portion which is formed so that it flexes in response to the difference in pressure exterior and interior of said sealed can to change the total volume within said can, whereby in operation of the fuel element a convection flow of liquid is established upward in said axial hole above said filter and downward through said filter into said peripheral gap.

10. A fuel element designed for vertical disposition in a nuclear reactor, which fuel element comprises a cylindrical fissionable nuclear fuel compact having an axially extending hole formed therein, a cylindrical neutron reflector pellet having an axially extending hole formed therein disposed above said fuel compact with said holes in axial alignment, an elongated outer sealed tubular can surrounding said fuel compact, the internal cross sectional dimensions of said tubular can being larger than those of said cylindrical fuel compact to provide a peripheral gap therebetween, said fuel compact axial hole being in fluid communication with said peripheral gap at a location below said fuel compact, a material which is liquid at the operating temperature of the fuel element and which has good thermal conductivity substantially filling said can including said axially extending holes and said peripheral gap, a porous filter element located in said tubular can vertically above said fuel compact, conduit means extending from said axial hole in said neutron reflector through said filter to a point thereabove, said surrounding sealed can at a location above said fuel compact having a flexible portion which is formed so that it flexes in response to the difference in pressure exterior and interior of said sealed can to change the total volume within said can without any accompanying significant change in the lateral surface area of said can, and support means disposed interior of said flexible portion to prevent localized complete collapse thereof, whereby in operation of the fuel element a convection flow of liquid is established upward in said axial hole to a location above said filter and downward through said filter into said peripheral gap.

11. A fuel element designed for vertical disposition in a nuclear reactor, which fuel element comprises a plurality of right circular cylindrical fissionable nuclear fuel compacts each of which having an axially extending hole formed therethrough, said compacts being disposed one vertically above another with said holes in axial alignment, a right circular cylindrical neutron reflector pellet having an axially extending hole formed therethrough disposed above said fuel compacts with said pellet hole in axial alignment with said fuel compact holes, an elongated outer sealed right circular tubular can surrounding said fuel compacts and said pellets, the internal diameter of said tubular can being larger than the diameters of said fuel compacts and of said pellets to provide a peripheral gap therebetween, said fuel compact axial hole being in fluid communication with said peripheral gap at a location below the lowermost fuel compact, sodium substantially filling said can including said axially extending holes and said peripheral gap, means in said can preventing said reflector pellet and said fuel compacts from moving significantly upward therein, a porous filter element located in said tubular can vertically above said fuel compact, and conduit means extending from said axial hole in said neutron reflector through said filter to a point thereabove, said surrounding sealed can including a hollow right circular cylindrical section of internal diameter D made of a ductile material which section is deformed into an internal dumbbell cross sectional shape having a major dimension of about 1.20 D, a minor dimension of about 0.20 D and a radius of curvature of about 0.20 D for each of the rounded ends of the dumbbell, whereby said deformed section flexes in response to the difference in pressure exterior and interior of said sealed can to change the total volume thereof, and whereby in operation of the fuel element a convection flow of liquid sodium is established upward in said axial holes to a location above said filter and downward through said filter into said peripheral gap.

12. A nuclear reactor fuel element cluster comprising a plurality of elongated fuel elements, each of which includes fissionable nuclear fuel and an elongated outer sealed tubular can of circular cross section surrounding said fissionable nuclear fuel, and also includes a material which is fluid at the operating temperature of the fuel element substantially filling the unoccupied space within said can, said sealed can having a portion made of a ductile material which portion is deformed to a cross sectional shape of lesser area but the same perimeter whereby said deformed portion flexes in response to the difference in pressure exterior and interior of said sealed can to equalize the pressure internally and externally of the fuel element, and means for interconnecting said plurality of nuclear fuel elements in parallel alignment for support within a nuclear reactor, said interconnecting means including a spacer frame having a plurality of square passageways extending therethrough and also including means mounting said plurality of fuel elements with the deformed portions thereof located within passageways of said spacer frame and oriented with the longer axis of the deformed portion positioned along a diagonal of the square passageway cross section, said deformed portion being so dimensioned that there is at least 3-point continuous contact maintained between the lateral surface thereof and the walls of said enclosing square passageway.

13. A nuclear reactor fuel element cluster comprising a plurality of elongated fuel elements each of which includes fissionable nuclear fuel and an elongated outer sealed tubular can of circular cross section surrounding said fissionable nuclear fuel, and also includes a material which is liquid at the operating temperature of the fuel element substantially filling the unoccupied space within said can, said sealed can having a portion made of a ductile material which portion is formed into dumbbell cross sectional shape and flexes in response to the difference in pressure exterior and interior of said sealed can to equalize the pressure internally and externally of the fuel element, and means for interconnecting said plurality of nuclear fuel elements in parallel alignment for support within a nuclear reactor, said interconnecting means including a spacer frame having a plurality of square passageways extending therethrough and also including means mounting said plurality of fuel elements with the deformed portions thereof located within passageways of said spacer frame and oriented with the longer axis of the deformed portion positioned along a diagonal of the square passageway cross section, said deformed portion being so dimensioned that there is at least 3-point continuous contact maintained between the lateral surface thereof and the walls of said enclosing square passageway.

14. A nuclear reactor fuel element cluster comprising a plurality of elongated fuel elements each of which includes fissionable nuclear fuel and an elongated outer sealed tubular can of circular cross section of internal diameter D surrounding said fissionable nuclear fuel, and also includes a material which is liquid at the operating temperature of the fuel element and which has good thermal conductivity substantially filling the unoccupied space within said can, said sealed can having a portion made of a ductile material which portion is formed into an internal dumbbell cross sectional shape having a major dimension of about 1.20 D, a minor dimension of about 0.20 D and a radius of curvature of about 0.20 D for each of the rounded ends of the dumbbell, whereby said deformed section flexes in response to the difference in pressure exterior and interior of said sealed can to change the total volume thereof and equalize the pressure internally and externally of the fuel element, and means for interconnecting said plurality of nuclear fuel elements in parallel alignment for support within a nuclear reactor, said interconnecting means including a spacer frame having a plurality of passageways of square cross section formed therein, the sides of said squares being equal to the outer diameter of said sealed can, said interconnecting means also including means mounting said plurality of fuel elements with the deformed portions thereof located within passageways of said spacer frame and oriented with the major dimension of the dumbbell portion lying along a diagonal of said square, the dimensions of said dumbbell portion being such that there is continuous 4-point contact maintained between the lateral surface thereof and the walls of said enclosing square passageway.

References Cited by the Examiner

UNITED STATES PATENTS 3,041,262    6/1962    Jens _____ 176—72
3,202,583    8/1965    Salesse et al. _____ 176—72 X

FOREIGN PATENTS 157,657    1/1957    Sweden.

BENJAMIN R. PADGETT, Primary Examiner.

M. J. SCOLNICK, Assistant Examiner.